UNITED STATES PATENT OFFICE.

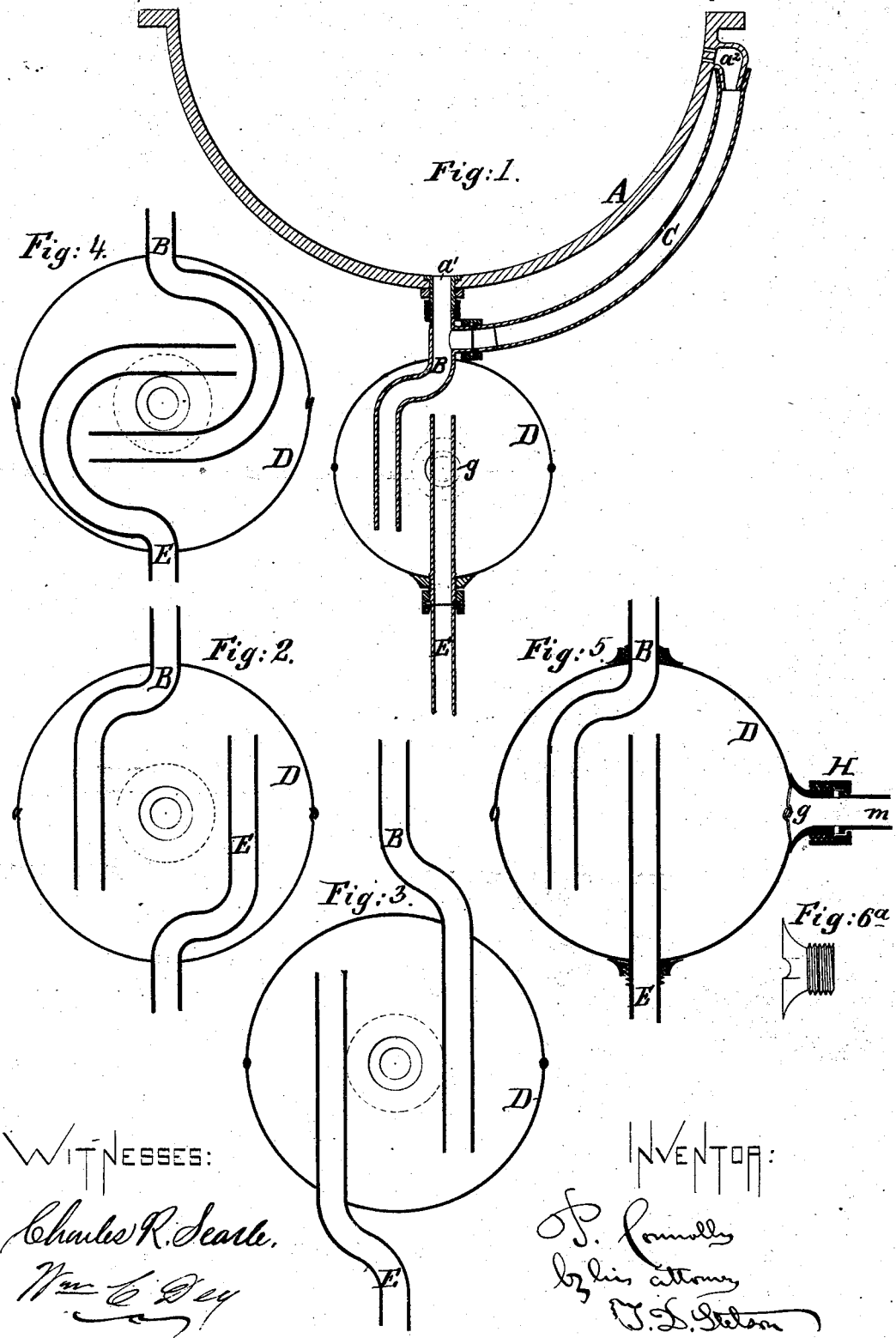

PATRICK CONNOLLY, OF BROOKLYN, NEW YORK, ASSIGNOR, BY MESNE ASSIGNMENTS, TO JULIA CONNOLLY, OF SAME PLACE.

PLUMBER'S TRAP.

SPECIFICATION forming part of Letters Patent No. 260,666, dated July 4, 1882.

Application filed October 3, 1881. (No model.)

*To all whom it may concern:*

Be it known that I, PATRICK CONNOLLY, of Brooklyn, in the county of Kings, in the State of New York, have invented certain new and useful Improvements in Plumbers' Traps, of which the following is a specification.

I provide in the place of any of the ordinary traps a case of two parts of metal, spun or otherwise formed into hemispherical cups or other suitable shape, and united with suitably-formed couplings therefor, inclosing a chamber of sufficient capacity. The pipes above and below are in two entirely distinct lengths. Both extend through tight-fitting apertures and terminate within the chamber. Each extends past the end of the other.

The accompanying drawings form a part of this specification.

All the figures are central vertical sections. All of the figures show the lengths of pipe extending past each other in the trap.

Figure 1 shows the invention having one straight and one bent pipe used in connection with a basin. Fig. 2 shows both pipes bent inside of the case. Fig. 3 shows both pipes bent outside of the case. Fig. 4 shows the pipes bent inside of the case, terminating horizontally. Fig. 5 represents the same construction as Fig. 1, with the addition that a pipe is connected at the cleaning-hole by a coupling. Fig. 6 represents the screw-threaded nozzle of the cleaning-hole detached.

Similar letters of reference indicate corresponding parts in all the figures where they occur.

My improved trap may be used in various positions. The pipes may extend up and down, so that one pipe will enter the chamber at the top and the other at the bottom, or it may extend horizontally, so that one pipe shall enter on the right-hand and the other on the left-hand side, or it may lie in various inclined positions, the pipes entering and emerging in lines making any desired angle with the perpendicular. I prefer the vertical position, and have so represented it in this particular form, and also in all the modifications. One of the situations in which this trap may be used is the ordinary one under a stationary hand-basin. I have indicated the situation of the trap in Fig. 1, where the invention is illustrated in the ends of the pipes extending past each other in the casing. There is an orifice, $g$, tightly stopped by a screw-cap or other suitable means, through which the interior of the trap can be examined and cleaned at intervals, when required, by simply removing the screw-cap. This orifice may be made the means of coupling a pipe from another source, if desired. Such coupling will be shown in one of the other figures.

A is the bowl, and $a'$ the bottom discharge-orifice.

B is a pipe, connected in any ordinary or suitable manner, which, after receiving the pipe C from the overflow-orifice $a^2$, extends into the casing D and bends considerably to one side therein, and then descends in the side position nearly to the bottom. The casing D is of copper or brass, made in two halves, united by solder or brazing. The parts or halves of the trap-casing D are preferably formed as two hemispherical cups, and are produced by spinning or otherwise, and are applied together by a slight lap and solder. The cups may be brazed together, but solder is preferable. In this way a very light trap is afforded with sufficient strength to withstand any ordinary pressure.

E is the pipe which extends from the trap downward, as in Fig. 1 and in all the other figures. The lower pipe, E, is practically a continuation of the upper pipe, B; but the connection is formed by the case D, which forms a tight chamber inclosing the ends of both pipes. There is no contact of the pipes B and E. The pipe B extends down in the interior of the trap nearly to the bottom. The pipe E presents its open end in the interior of the trap near the top. The water flows down through the pipe B, and, after rising in the trap to a level beyond the end of the pipe E, flows out through the latter. When the water ceases to flow down, the trap remains filled to the level of the top of the pipe E. This effectually seals the pipe B and prevents any rise of air, sewer-gas, or other gaseous matter through the pipe under any conditions.

Fig. 2 shows both pipes bent in the same manner as the upper pipe, B, is bent in Fig. 1. This is a good construction. Fig. 3 shows a corresponding arrangement of the pipes and of the connections thereof to the chamber, but with each pipe B and E bent outside of its connection to the trap. This is a good construction. Fig. 4 shows each pipe greatly bent in the interior of the chamber. Each, after entering within the chamber, is bent strongly to one side. It thence upward extends with a curve of considerable radius, and then extends a considerable distance horizontally. The two are arranged so as not to interfere with each other. This is a good construction. It may be preferable in cases where the trap is introduced to connect lengths B E of pipe which are not one above the other, but are considerably inclined, or even extend along horizontally. In Fig. 5 an additional pipe, $m$, is connected at the cleaning-hole by a coupling, H. My trap in any of these forms is not liable to siphon. Siphoning is due to a sudden pressure on the water in the pipe, which in ordinary traps can throw the small amount of water in the bend sufficiently over into the discharge to leave the trap unsealed. In my trap the considerable quantity of water inclosed in the chamber is not thus impressed with motion, even if a sufficient pressure of air or other gas be introduced to force the trap. In my trap a forcing only results in the air or gas descending through the pipe B and bubbling up through the water in the trap. A pressure of gas in the opposite direction simply lowers the level of the water in the trap and forces up a corresponding amount in the pipe B. No pressure induced by ordinary forces—as a gale of wind blowing in the mouth of a sewer, or even a rise in the tide imprisoning air in the sewer—can accumulate sufficient pressure to force the trap in the opposite direction. Sewer-gas cannot be discharged into the building.

Other modifications may be made. Parts of the invention may be used without the whole. I can use glass, but prefer metal, and may use other modes of attachment than those represented; but the employment of glass is of great advantage in allowing a light placed behind it to reveal the condition of the interior. My couplings M B' D' allow this material to be joined strongly and tightly. The pipes, when bent, may be bent considerably less than is here shown. Different means may be employed for connecting the pipes tightly to the body D. The latter need not be a sphere. It may be in various forms. The nozzle at the cleaning-hole need not extend outward. There may be internal screw-threads or other means of attachment on a re-enforce which may extend inward. Various other means of attachment may be provided. The orifice $g$ need not be at the precise level here shown.

I can use the orifice $g$ as a point of connection for the overflow-pipe C by coupling the latter directly thereto and of course omitting the connection of C to B. I have called the orifice $g$ a "cleaning-hole," but I believe the trap will rarely need cleaning. From the facility it offers for attaching a branch pipe it may be termed a "branch connection."

I can join each half permanently to the pipes B and E, respectively, by soldering. I can cast the pipe E in one with one half of the casing D and cast the other pipe in one with the other half of the casing.

It is obvious that where the casing D is made of sheet metal, as described, the weight of the trap is reduced to a minimum.

My improved trap holds a larger quantity of water than is customary in the usual forms of such devices.

I do not in this patent claim the making of the case D of glass, such being the subject-matter of a separate application for patent.

I do not claim anything shown in the patent to S. O. Blanding of November 17, 1868, as that device would not serve the purposes of mine, because his pipes are adapted to carry the liquid in the opposite direction, and are furnished with a strainer, which would clog and defeat the objects of a plumber's trap.

I reserve the right to make separate applications for patent for the trap having the outlet-pipe attached to the side thereof.

I claim as my invention—

1. In a plumber's trap, the pipes B E, extending each past the end of the other, and each having one of the two parts of the casing D secured to it, in combination with said casing, substantially as set forth.

2. The casing D, having an orifice, $g$, with provisions for properly closing it, in combination with the two pipes B E, arranged with their ends each extending in the interior of the casing D beyond the end of the other, as herein specified.

In testimony whereof I have hereunto set my hand, at New York city, this 30th day of September, 1881, in the presence of two subscribing witnesses.

P. CONNOLLY.

Witnesses:
CHARLES C. STETSON,
H. A. JOHNSTONE.